Oct. 3, 1933.   J. GROLÉE   1,928,854
ELECTRODE SUSPENSION MEANS
Filed July 18, 1931
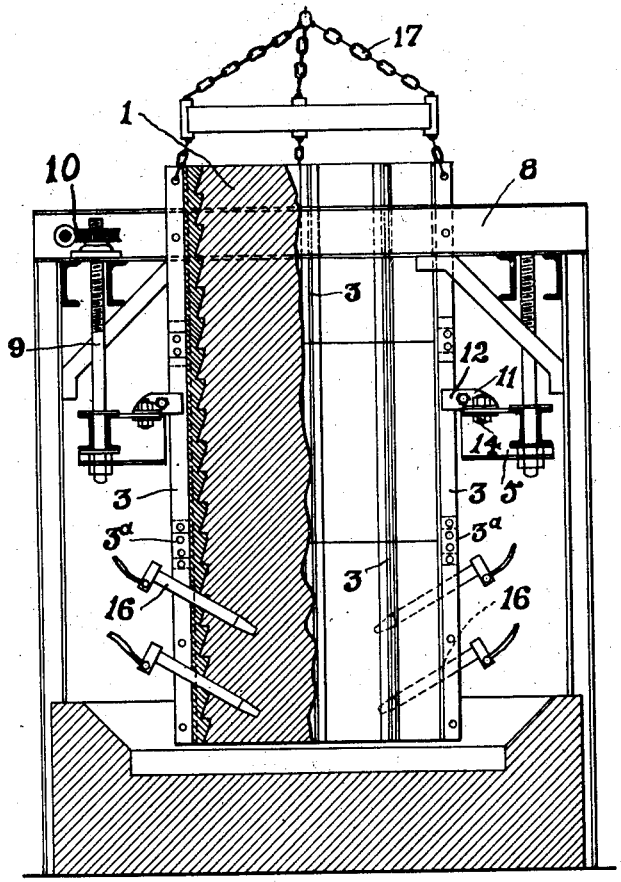
FIG.1.
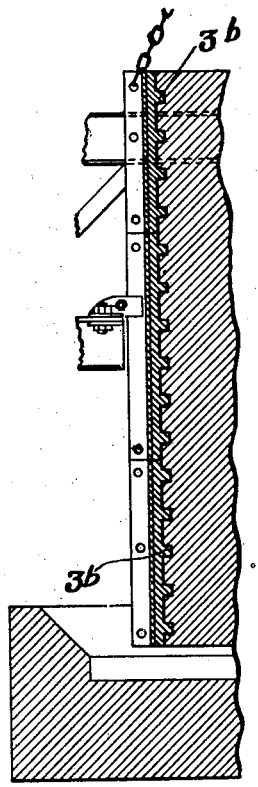
FIG.2.
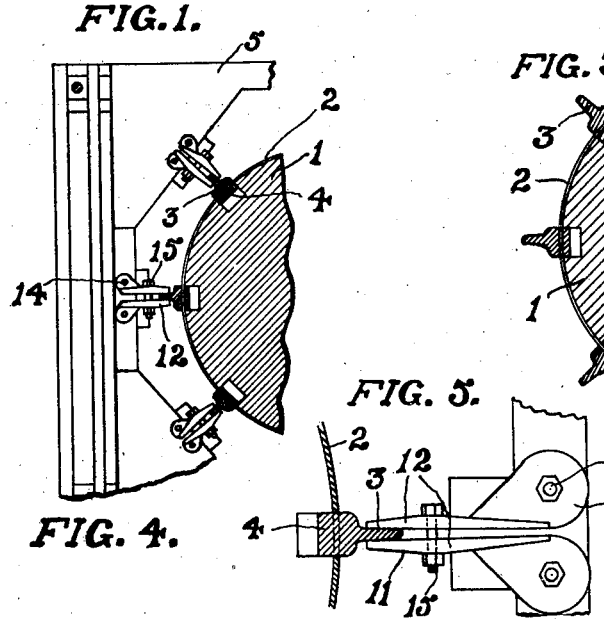
FIG.3.
FIG.4.
FIG.5.
INVENTOR
JEAN GROLÉE
BY Dorsey & Cole
ATTORNEY Patented Oct. 3, 1933

1,928,854

UNITED STATES PATENT OFFICE 1,928,854

ELECTRODE SUSPENSION MEANS

Jean Grolée, Tarascon Sur Ariege, France, assignor to Det Norske Aktieselskab for Elektrokemisk Industri, Oslo, Norway Application July 18, 1931, Serial No. 551,867, and in Norway July 23, 1930

7 Claims. (Cl. 13—18)

This invention relates to an electrode suspension means, particularly adaptable to electrodes of the type which are baked in the furnace in which they are used (i. e., the so-called Soderberg electrodes). Ordinarily, with this type of electrode, a holder is used which surrounds the electrode, and which comprises sections or gripping means which engage the electrode and press upon the same on the more or less baked zone of the electrode which occurs above the top of the furnace. Since different conditions, and different types of furnaces in which the electrodes are used, require varying electrode consumption, such consumption may vary between for instance, one-half inch to forty inches per day, and the electrode consumption makes it necessary to feed the electrode to the furnace from time to time as it is consumed. The feeding of the electrode is usually accomplished by loosening the grip holder until the electrode, under the influence of its own weight, slips through the holder as far as is desired, whereupon the grip holder is again tightened.

The use of the grip holders of the ordinary type is accompanied at times with certain disadvantages, particularly where the consumption of the electrode requires frequent feeding, or where the installation is such as to make difficult the feeding of the electrode, or where the space around the electrode is not adapted or available for the usual holder. In the use of electrodes in furnaces for producing aluminum, and for similar purposes, for example, the electrodes are usually of large dimensions, for instance, eighty-five inches in diameter, and weigh, often times, in the neighborhood of fifteen tons. In such an installation, the grip holder is a heavy and complicated device, requiring a series of movable parts in order to give satisfactory results, and these movable parts usually are operated separately when the electrode is to be allowed to slip, as otherwise the electrode may have a tendency to slide more on one side than on the other, and thus become disaligned with the furnace. Further, in this type of installation, the baking of the electrode proceeds only a comparatively short distance upwardly in the electrode, so that the grip holder needs to be placed close to the surface of the bath. Since the temperature of the bath is usually relatively low, the electrode paste, even adjacent the surface of the bath is often times not as thoroughly baked as in other installations where the temperature is higher, and these conditions have given rise in some instances to further disadvantages which are caused by the grip holders deforming the electrode, or causing cracks or breaks therein. A further disadvantage with the use of the grip holders as suspension means for the electrode, is that it sometimes interfers with the means for introducing current into the electrode, particularly where the current is supplied through contacts which extend into the electrode through the casing from the outside, such for instance, as in the manner disclosed in U. S. Patent No. 1,751,695, to Westly.

One of the objects of this present invention is to provide a suspension means which does away with the disadvantages as outlined above, which accrue to the grip holder type of electrode-suspending means.

Another object of the invention is to provide a suspension means, particularly adaptable for the type of electrodes which are baked in the furnace in which they are used in which the suspending means is attached directly to the metallic casing, or to the ribs or other extensions with which it is provided, and supports the electrode without bringing pressure to bear on the electrode paste.

A further object of the invention is to provide an electrode suspension means which may support the electrode from the upper part thereof, at a point well above the furnace, so as to leave the portion of the electrode above the path as free as possible of obstructions, whereby to afford plenty of room for a workman to manipulate his tools when breaking through the crust of the bath, for instance, in eliminating the anode effect, or in mixing new alumina into the bath. It will be understood that the furnace crucibles are often quite narrow with respect to the electrode diameter, so that this work is rendered difficult, particularly if the electrode holder is placed just above the surface of the bath, as is the case with the grip holder type of suspending means.

A further object of the invention is to provide an electrode-suspending means which is adapted to engage the ribs or other extensions of the electrode, and thereby support the electrode, so that the electrode casing can be lengthened by welding or by the addition of new sections, without interfering with the holder.

With these and other objects in view which will become apparent as the description proceeds, reference is made to the accompanying drawing, in which one of the forms that the invention may take is illustrated, and in which,—

Figure 1 represents an elevational view, partially in section, of an installation made according to my invention.

Figure 2 represents a fragmentary vertical sectional view of an installation showing a different form of electrode rib.

Figure 3 represents a horizontal sectional view through an electrode.

Figure 4 represents a fragmentary plan view, partially in section, of the installation shown in Figure 1.

Figure 5 represents an enlarged fragmentary plan view showing one of the suspension clamps.

In the drawing, an electrode is indicated at 1, in an installation suitable for the electrolytic production of aluminum. The electrode casing is indicated at 2, and at 3 are indicated the external ribs by which the electrode may be suspended according to my invention. These ribs on the inner side of the casing 2, project inwardly into the paste of the electrode as at 4, and the inwardly projecting portions of the ribs may be of saw-tooth arrangement, as indicated, which afford a good connection between the ribs and the lower baked portion of the electrode, to thereby adequately support the electrode mass within the casing. The ribs may either be integral with the casing, or they may be fixed thereto by welding, or in other suitable manner. The casing itself, it will be understood, may be made in different ways, for instance, by using rolled sheets, or by casting the sheets in suitable shape and size from aluminum. The sections of the casing may be connected together by means of plates 3ª which may overlap adjoining portions of the ribs 3 and may be secured in suitable manner as for instance, by bolts or rivets.

A suspension frame is indicated at 5, and this frame may be suspended from the platform 8, by means of the screw hoists 9, the latter being adapted for rotation through suitable gearing 10, for raising or lowering the suspension frame, and with it the electrode, through the instrumentality of the clamping means 11. Each of the clamping means comprises a pair of plates 12 provided with webs or bases 13 by which they are pivotally mounted as at 14 on the suspension frame 5, at suitable points around the electrode. The clamp plates 12 at their inner ends are adapted to engage between them the external ribs 3 of the electrode casing, and bolts or other suitable tightening means 15 connect the clamping plates together at points outside of the ribs. In this way the clamps grip the ribs with sufficient tightness to sustain and support the electrode, the weight of the latter being transmitted through the clamps to the suspension frame 5 and thence through the screw hoists 9, to the platform 8.

As the electrode is consumed at its lower end, it may be lowered from time to time as desired, by operating the screw hoists, until the frame gets so close to the furnace as to interfere with the proper introduction and removal of the inserts 16 which are utilized for introducing the current. The clamps 11 may then be loosened, the suspension frame raised, and the clamp reattached to the ribs higher up on the electrode. During this change, the electrode may be suspended in suitable manner, for instance, through the chain-suspension means indicated generally at 17, which may be attached to a crane, not illustrated, which thus supports the electrode while the suspension means is being shifted to a higher point. It will be understood that the chain-suspension means 17 may be removed from the electrode during normal operation, and while the latter is supported by the suspension means of this invention, so that the upper end of the electrode is free to have additional casing sections and electrode paste added thereto from time to time. With the suspension means of this invention, the casing is made sufficiently strong to withstand the strain and the weight placed upon it, and is sufficiently connected to the electrode mass through the toothed aluminum ribs. In aluminum furnaces the casings are usually made from metallic aluminum, so that the metal of the casing as it melts and drops into the bath will not contaminate the latter. Since the melting point of aluminum is in the neighborhood of 660° C., I take precaution to prevent the metallic ribs or internal extensions melting off before the baking of the electrode has proceeded sufficiently above their lower ends to insure a sufficient connection between the ribs and the baked part of the electrodes. In accomplishing this, the casings are provided with ribs that are relatively wide with reference to their depth in the electrode mass, so that while they extend only a comparatively short way into the electrode, they afford a wide contact surface with the electrode paste, so that the latter is not only effectively supported, but the ribs are kept effectively cool by reason of their wide surface area on the outside of the casing, and by reason of the quick conduction of the heat to the external electrode casing. The casing itself is preferably made relatively thick in order that its heat conductivity will be sufficient to prevent the internal ribs from melting away at points too high up in the electrode.

Tests have shown that when the ribs are made in the manner that has been described, they keep from melting away, even down to the very surface of the bath, notwithstanding that the temperature of the latter may be in the neighborhood of 1000° C. The baking of the electrode paste, it has been found, proceeds upwardly from about twenty to about forty inches above the surface of the bath, so that by thus preventing the ribs from melting away too early, a sufficient connection between the baked part of the electrode and the ribs, to insure a safe suspension of the electrode and retention of the mass therein, is obtained.

The form of squared teeth on the inner portion of the ribs, as shown at 3ᵇ in Figure 2, may also be used. In either form, the width of the ribs may be equal to about one-fourth of their depth, as this proportion has been found to afford the advantages of effective support, and cooling, pointed out above.

Instead of introducing the current in the manner shown, the current-conducting cables may be fixed to the external ribs at points under the suspension frame, so that the ribs may be used for supplying the electric current to the electrode. Or a combination of both arrangements may be used.

The foregoing description has been given for purposes of illustration and understanding of the invention, and no undue limitations are to be deduced therefrom, but the appended claims should be construed as broadly as permissible, in view of the prior art.

Having thus described my invention what I claim is,—

1. In an electrode of the type which is baked in the furnace in which it is used comprising a metallic casing having externally projecting ribs, the combination with the electrode of a suspension device including clamps engaging the ribs, a frame on which the clamps are supported, and means for raising and lowering the frame.

2. A suspension device for electrodes having externally projecting ribs comprising a suspension frame, a pair of clamps pivoted on the frame, and means for drawing the clamps into binding engagement with the ribs.

3. The combination of an electrode having a casing provided with an externally projecting rib, of a suspension frame, a pair of clamps pivoted on the frame and engaging the externally projecting rib, and means connecting the clamps together at the point outside of the rib for detachably maintaining the clamps in engagement with the rib.

4. An electrode comprising a metallic casing, an electrode mass, said casing being provided with ribs having toothed portions projecting into the electrode mass and having portions projecting outwardly from the casing, in combination with a clamping device adapted to engage the outwardly projecting portions of the ribs for suspending the electrode.

5. The combination with an electrode having a metallic casing the casing being provided with external projecting ribs, of a frame surrounding the upper portion of the casing, and suspending means for the electrode interconnecting the external projecting ribs of the casing and the frame, whereby additional sections may be added to the upper end of the electrode without disturbing the suspending means for the electrode.

6. In an electrode having a casing provided with externally projecting portions and including an electrode mass contained within the casing, the combination with the electrode, of means engaging the projecting portions of the casing to thereby support the electrode without exerting pressure upon the electrode mass.

7. In an electrode of the type which is baked in a furnace in which it is used comprising a casing provided with externally projecting portions, and electrode mass contained therein, the combination of teeth carried by the casing and projecting into the mass, said teeth being of a width and depth sufficient to support the electrode mass, means engaging the projecting portions for supporting the casing without exerting pressure on the electrode mass, and means for raising and lowering the said supporting means.

JEAN GROLÉE.